(12) United States Patent
Wise

(10) Patent No.: US 11,304,495 B1
(45) Date of Patent: Apr. 19, 2022

(54) REPEATEDLY REFILLABLE REUSABLE DISPENSER

(71) Applicant: Robert Wise, Penngrove, CA (US)

(72) Inventor: Robert Wise, Penngrove, CA (US)

( * ) Notice: Subject to any disclaimer, the term of this patent is extended or adjusted under 35 U.S.C. 154(b) by 215 days.

(21) Appl. No.: 16/856,362

(22) Filed: Apr. 23, 2020

Related U.S. Application Data

(63) Continuation-in-part of application No. 16/855,361, filed on Apr. 22, 2020, which is a continuation-in-part of application No. 16/683,689, filed on Nov. 14, 2019.

(51) Int. Cl.
*A45D 40/04* (2006.01)
*A45D 40/16* (2006.01)
*B65D 83/00* (2006.01)

(52) U.S. Cl.
CPC ............. *A45D 40/04* (2013.01); *A45D 40/16* (2013.01); *B65D 83/0011* (2013.01)

(58) Field of Classification Search
CPC ..... A45D 40/04; A45D 40/16; B65D 83/0011
See application file for complete search history.

(56) References Cited

U.S. PATENT DOCUMENTS

| | | | |
|---|---|---|---|
| 3,913,595 A * | 10/1975 | Grisel | A45D 40/04 401/75 |
| 4,605,330 A * | 8/1986 | Crowley | A45D 40/04 401/175 |
| 5,255,990 A * | 10/1993 | Dornbusch | A45D 40/04 401/172 |
| 5,547,302 A * | 8/1996 | Dornbusch | A45D 40/04 401/172 |
| 6,269,982 B1 * | 8/2001 | Kreiseder | A45D 40/04 222/326 |
| 2006/0076370 A1 * | 4/2006 | Etesse | B65D 47/2031 222/494 |
| 2008/0050168 A1 * | 2/2008 | Groh | B65D 83/0011 401/68 |
| 2013/0170886 A1 * | 7/2013 | Thulin | A45D 40/04 401/68 |
| 2016/0174687 A1 * | 6/2016 | Ellsworth | A45D 40/04 401/65 |
| 2018/0086542 A1 * | 3/2018 | Ellsworth | A45D 34/04 |
| 2021/0061533 A1 * | 3/2021 | Chen | B65D 21/0233 |

* cited by examiner

Primary Examiner — Patrick M. Buechner
(74) Attorney, Agent, or Firm — Boudwin Intellectual Property; Daniel Boudwin

(57) ABSTRACT

A repeatedly refillable reusable solution cartridge retrofit device for a dispenser includes a housing which has a bottom side and an opened upper side. A screw rod is coupled through the housing such that it is rotatably secured to the bottom of the housing. A cartridge plate further engages with the screw rod. The cartridge plate is connected to a cartridge which includes a spreadable substance. Upon use a housing of the cartridge is removed revealing the spreadable substance.

15 Claims, 11 Drawing Sheets

REPEATEDLY REFILLABLE REUSABLE DISPENSER

CROSS REFERENCE TO RELATED APPLICATIONS

This application claims the benefit of U.S. patent application Ser. No. 16/855,361 filed on Apr. 22, 2020 with is a continuation in part of U.S. patent application Ser. No. 16/683,639 filed on Nov. 14, 2019. The above identified patent application is herein incorporated by reference in its entirety to provide continuity of disclosure.

BACKGROUND OF THE INVENTION

The present invention relates to a dispenser housing. More particularly, the present invention provides a housing that has is adapted to accept refill cartridges.

A large number of humans use deodorant, or similar spreadable substances every day. These substances often come in plastic canisters. These canisters are meant to be used once then tossed aside. While these canisters are functional and inexpensive, they also create waste.

Plastic takes decades to decompose and all the while takes space in landfills. The trash issue in our planet is starting to reach critical levels as more and more things are made to be disposable. Items such as canisters take up even more room due to the nature of having the canister having an interior volume to hold a solution which is dispensed through the usage of the consumable product. Due to the number of canisters used these items account for a significant amount of landfill.

Consequently, there is a need in for an improvement in the art of dispenser housings in order to provide for waste reduction. The present invention substantially diverges in design elements from the known art while at the same time solves a problem many people face when using dispensers to apply substances to a desired surface, such as an individual's body. In this regard the present invention substantially fulfills these needs.

SUMMARY OF THE INVENTION

The present invention provides a refillable dispenser housing, wherein the same can be utilized for providing convenience for the user when using dispensers to apply substances to a desired surface. The repeatedly refillable reusable dispenser comprises a dispenser housing having a sidewall, a base and an open top end. A cap is removably secured to the open top end of the housing. The cap has a plurality of apertures located therein. The side wall has an aperture located therethrough. A movable dispenser base is disposed within the housing, wherein the movable dispenser base creates a seal with the sidewall. A screw rod is secured within the housing and has a knob attached. The knob will rotate the screw rod when turned. The screw rod and the knob are rotatably attached within the dispenser housing such that the knob protrudes through the aperture. A scissor lift is attached to the screw rod at a first pair of ends. The scissor lift is attached to the movable dispenser base at a second pair of ends.

Another object of the repeatedly refillable reusable dispenser is to have a lid, where the lid is configured to be placed upon the open top end of the dispenser housing.

Another object of the repeatedly refillable reusable dispenser is to have the first pair of ends of the scissor lift have a pair of threaded apertures configured to attach to the screw rod.

Another object of the repeatedly refillable reusable dispenser is to have the second pair of ends of the scissor lift have an attachment device located thereon, wherein the attachment device attaches to the movable dispenser base.

Another object of the repeatedly refillable reusable dispenser is to have the movable dispenser base have a pair of attachment apertures located on a bottom side thereof.

Another object of the repeatedly refillable reusable dispenser is to have the attachment apertures be elongated apertures such that the attachment devices located on the scissor lift are slidably connected to the attachment apertures.

Another object of the repeatedly refillable reusable dispenser is to have a disposable cartridge filled with deodorant.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
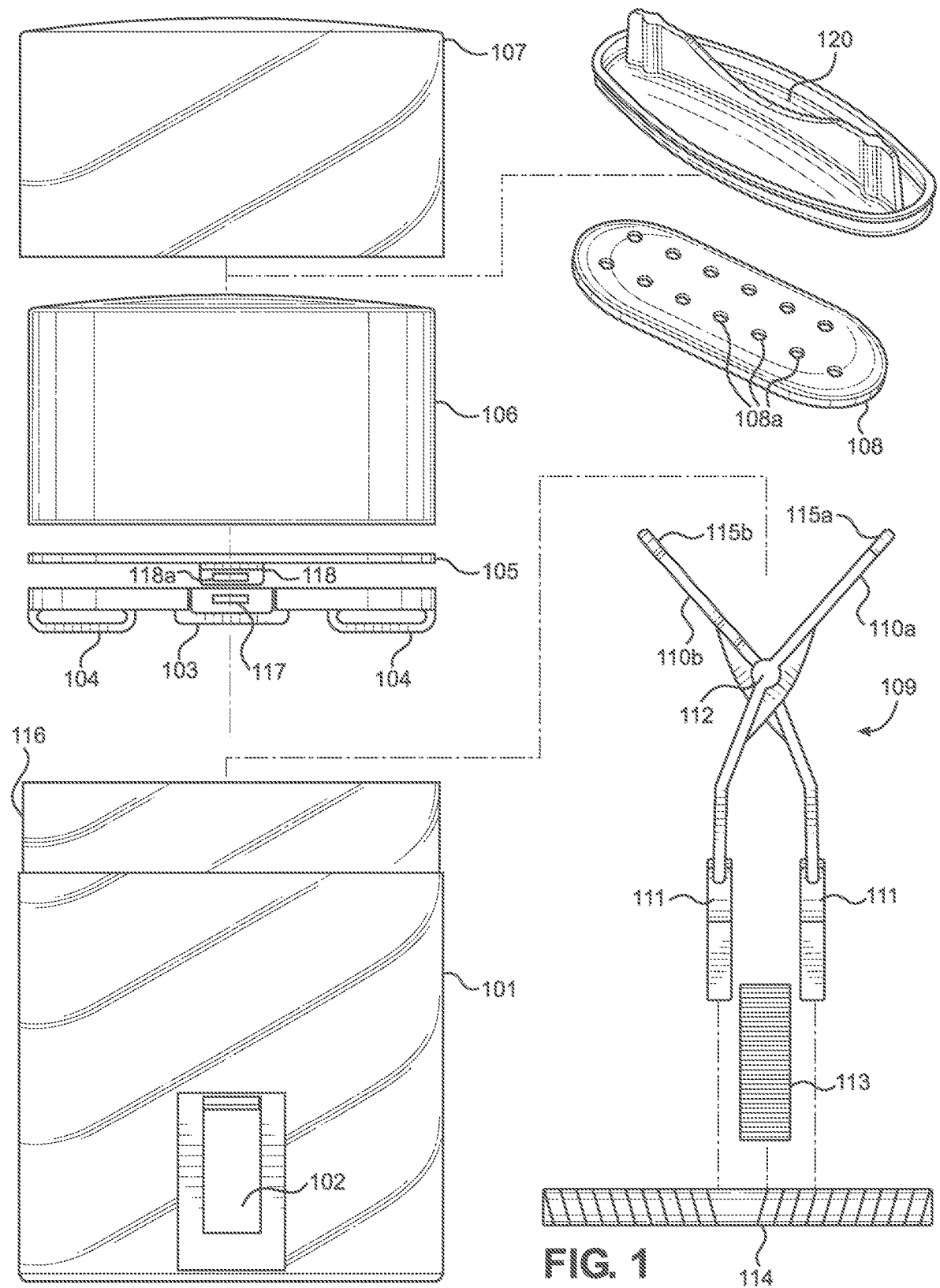
FIG. 1 shows an exploded view of an embodiment of the repeatedly refillable reusable dispenser.

Reference is made herein to the attached drawings. Like reference numerals are used throughout the drawings to depict like or similar elements of the refillable dispenser housing. For the purposes of presenting a brief and clear description of the present invention, a preferred embodiment will be discussed as used for the refillable dispenser housing. The figures are intended for representative purposes only and should not be considered to be limiting in any respect.

Referring now to FIG. 1, there is shown an exploded view of an embodiment of the repeatedly refillable reusable dispenser. The refillable dispenser housing includes a housing 101. The housing has a base, a sidewall and an open top end. The sidewall has an aperture 102 located therethrough. In one embodiment, there is a first aperture 102 located through the sidewall on one side and a second aperture is located on the sidewall opposite the first aperture and in alignment therewith. In one embodiment, the sidewall is configured to have a lip 116 located about a top end. The lip 116 is configured to accept a lid 107 thereon. The lid 107 is configured to have a friction fit.

In one embodiment, there is a cap 108 configured to fit within the open top end. The cap is configured to be removably placed within the open top end. In the illustrated embodiment, the cap 108 has a lip placed there around. The lip will prevent the cap from being placed too far into the housing 101. The cap 108 has a plurality of apertures 108a located therethrough. The plurality of apertures 108a will allow gel substances to be pushed therethrough. The cap 108 has a smooth upper surface. In one embodiment, the cap 108 has a rounded arch shape. This shape will better conform to and spread deodorant to an underarm.

In one embodiment there is further a freshness sealing cap 120. The freshness sealing cap 120 is configured to be placed on the top of the container 101. In one embodiment the freshness sealing cap is made from polyvinyl alcohol. This will allow the freshness sealing cap 120 to be biodegradable and disposable. The freshness sealing cap 120 will keep the spreadable substance fresh for an extended period of time.

The interior of the housing 101 contains a movable dispenser base 103. The movable dispenser base 103 is shaped to movably fit within the housing 101. The movable dispenser base 103 has a top side and a bottom side. The bottom side of the movable dispenser base 103 has a pair of attachment apertures 104. In one embodiment the attachment apertures 104 are elongated apertures. This will allow the attachment device 115a, 115b (described below) to slide horizontally within the apertures. This will better enable the scissor lift 109 (described below) to rise and lower.

The top side of the movable dispenser base 103 is configured to fit a substance attachment clip 105. In one embodiment, the substance attachment clip 105 is made from a biodegradable substance. In a further embodiment the substance is formed polyvinyl alcohol. In another embodiment the substance is paper covered in polyvinyl alcohol. In one embodiment the substance attachment clip 105 is dissolvable in an aqueous media. This will allow the attachment clip to eliminate space in landfills.

The movable dispenser base 103 has a protruding pin 117 located on at least one side thereof. The protruding pin 117 is configured to fit within an aperture 118a located on a tongue 118 attached to the substance attachment clip 105. In one embodiment the substance attachment clip 105 creates a waterproof seal with the sides of the housing 101. This will prevent gel substances from leaking into the housing below the movable dispenser base 103. In one embodiment the substance attachment clip 105 is configured to removably attach to the top side of the movable dispenser base 103.

The interior of the housing 101 further contains a scissor lift 109. The scissor lift 109 is comprised of a first side 110a and a second side 110b. The first side 110a and the second side 110b are attached with a rotating pin device 112. This device will allow the first side 110a and the second side 110b to rotate. The scissor lift 109 has an attachment device 115a, 115b. The attachment device is configured to slidably connect to the attachment apertures of the movable dispenser base 103. In one embodiment the attachment device 115a, 115b is a hook. At the opposite end of each side 110a, 110b there is an attachment 111 located at the bottom of each side 110a, 110b. In one embodiment the attachment 111 has a threaded portion.

The threaded portion within the attachment 111 is configured to attach to a screw rod 114. The screw rod 114 has threads located thereon. The threads are configured such that when the screw rod 114 is rotated, both attachments 111 will move towards each other; or away from each other respectively. In this manner, the scissor lift 109 will extend or collapse. In one embodiment the threads are configured to move the scissor lift in a large amount with only a small turn. For example, in one embodiment, one full rotation of the screw rod 114 will move the scissor lift 109 halfway into the extend position from fully collapsed. The screw rod 114 has a knob 113 attached. The knob 113 is configured to be wider that the screw rod 114. In one embodiment the knob 113 has a texture located around the outer edge. The texture will make the knob easier to turn.

The refillable dispenser is configured to hold a spreadable substance 106. In one embodiment, the spreadable substance 106 is a solid substance. In another embodiment, the spreadable substance 106 is wrapped in a biodegradable container. The container is removed and the spreadable substance 106 is inserted into the housing. In one embodiment the spreadable substance 106 is attached to the movable dispenser base 103 using a substance attachment clip 105.

In some embodiments the spreadable substance 106 is a gel substance. In this embodiment, the gel substance is located within a removable cartridge. In one embodiment the cartridge is a biodegradable cartridge. In one embodiment the cartridge is dissolvable in an aqueous media. In some embodiments that cartridge is a collapsible cartridge. This will allow for a gel substance to remain in the cartridge and be squeezed therefrom. In another embodiment the cartridges is designed to be removed from a solid spreadable substance and only the substance is placed in the housing 101. The cartridge is placed within the house 101 by attaching the attachment clip 105 to the movable dispenser base 103. The cap 108 is then attached to the open top end of the housing 101. As the spreadable substance 106 is pushed up and out of the cap 108 the cartridge will collapse.

Figure 2:
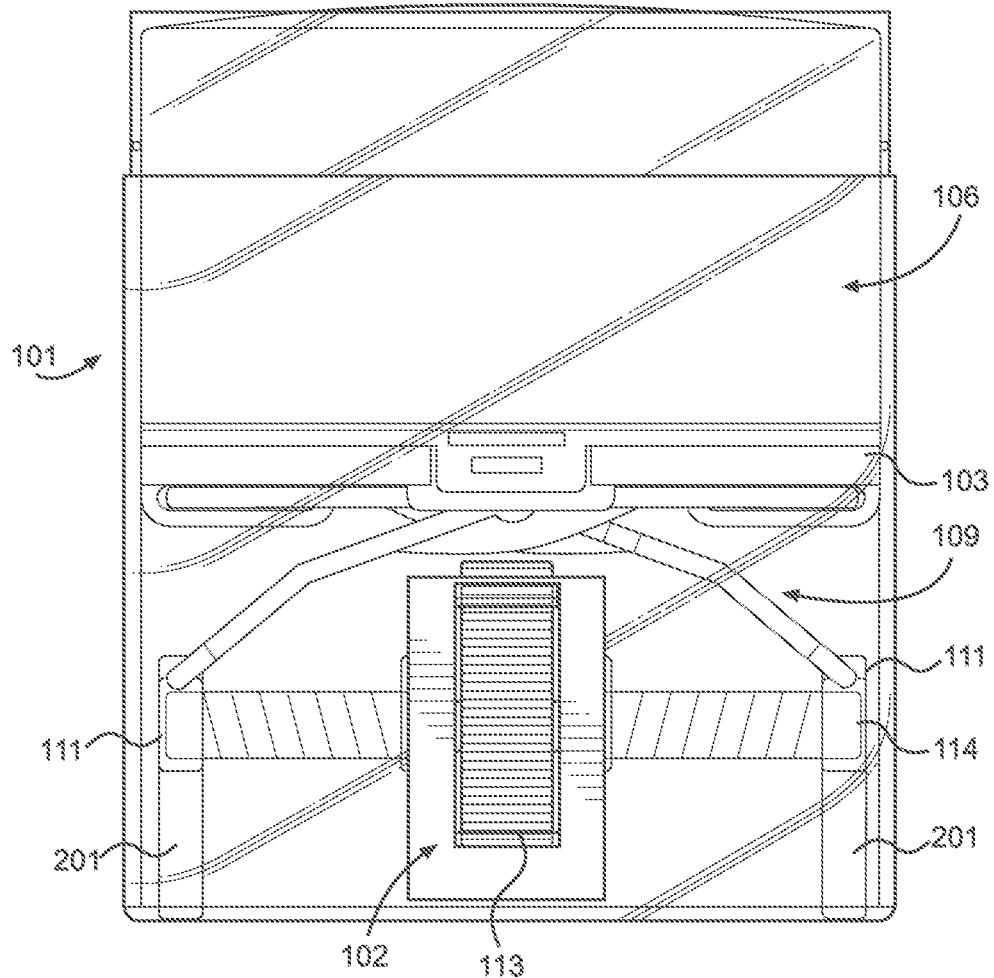
FIG. 2 shows a front view of an embodiment of the repeatedly refillable reusable dispenser in a collapsed position.

Referring now to FIG. 2, there is shown a front view of an embodiment of the repeatedly refillable reusable dispenser in a collapsed position. In the collapsed position, the scissor lift 109 is flattened such that it rests directly over the knob 113. In this position the scissor lift 109 will be at the outer edge of the screw rod 114. The movable dispenser base 103 will be lowered into the housing 101. The spreadable substance 106 will be positioned such that it is fully encapsulated within the housing 101.

In one embodiment the threaded attachment 111 has an elongated member 201 attached to a lower part thereof. The elongated member 201 is configured to allow the threaded attachment 111 to still attach to the screw rod 114. This is due to the fact that the elongated member 201 is located below the threaded attachment 111. The elongated member 201 is long enough that it will reach the bottom of the housing 101. This will take the weight of the spreadable substance 106 away from the scissor lift 109. The weight from the spreadable substance 106 will be displaced to the bottom of the housing 101.

Figure 3:
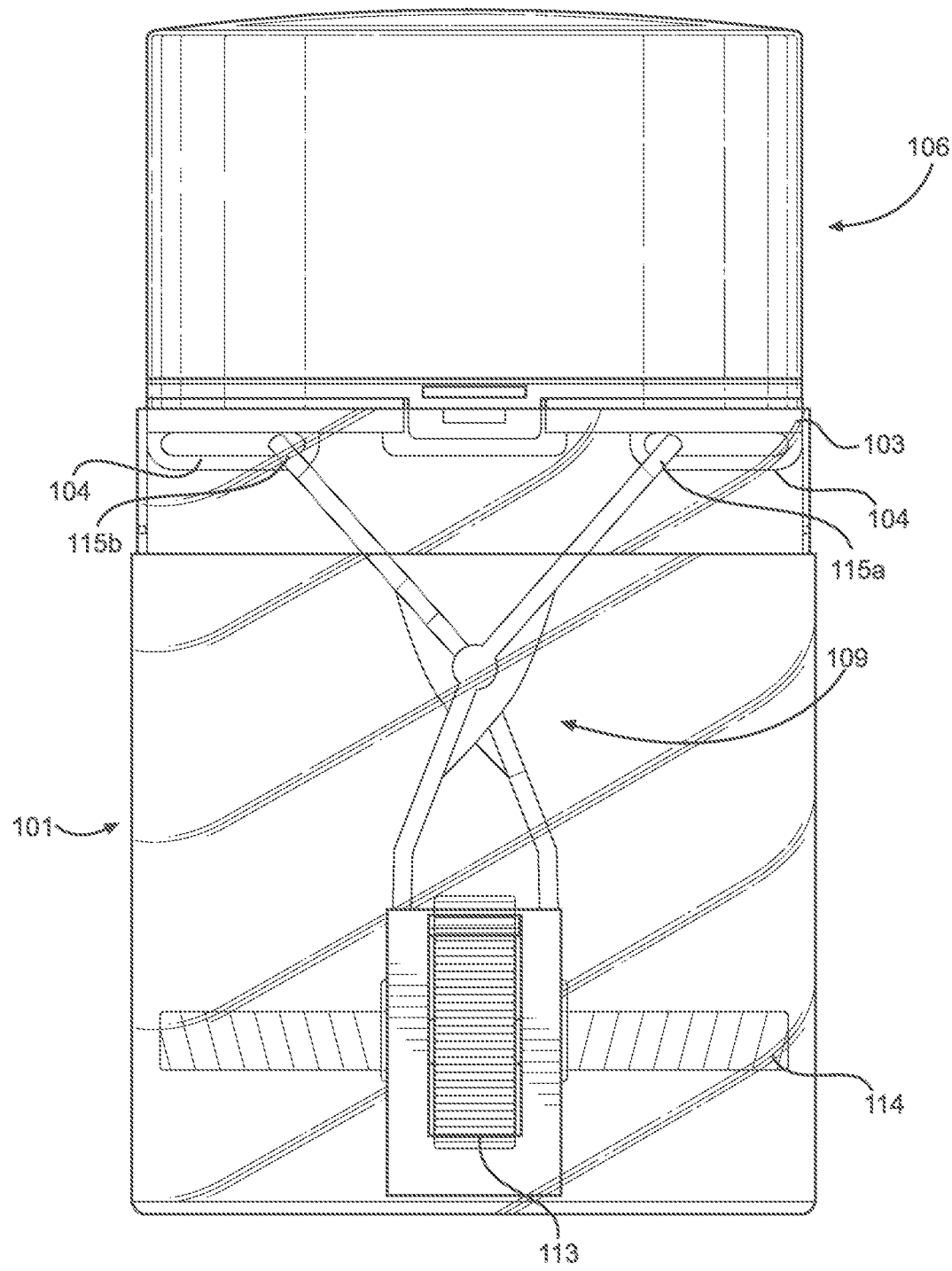
FIG. 3 shows a front view of an embodiment of the repeatedly refillable reusable dispenser in an expanded position.

Referring now to FIG. 3, there is shown a front view of an embodiment of the repeatedly refillable reusable dispenser in an expanded position. In the expanded position the scissor lift 109 is in an extended position. As the movable dispenser base 103 is lifted by the scissor lift 109 the attachment device 115a, 115b will slide within the connection apertures 104. As the scissor lift 109 is pulled closer to the knob on the screw rod 114, the scissor lift 109 will force the movable dispenser base 103 upward. This will push the spreadable substance 106 out of the open top end of the housing 101.

Figure 4:
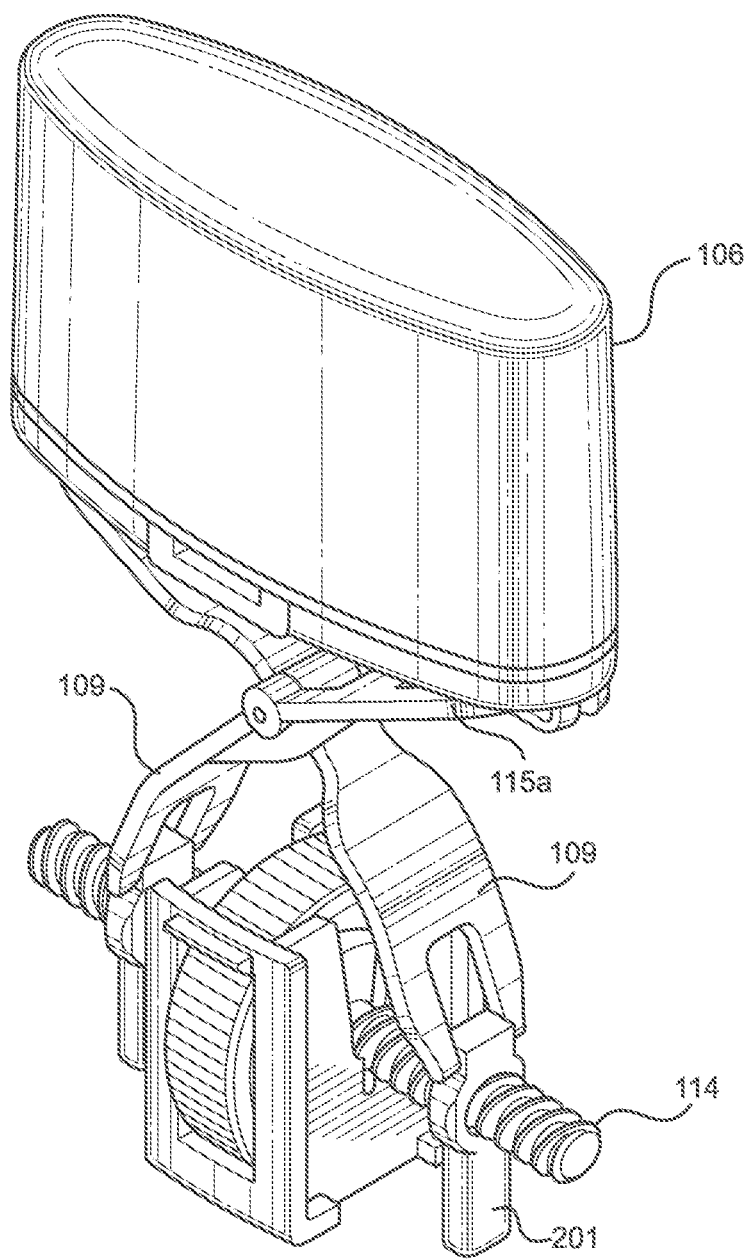
FIG. 4 shows a perspective view of an embodiment of the mechanism designed be placed within the housing.

Referring now to FIG. 4, there is shown a perspective view of an embodiment of the mechanism designed be placed within the housing. In the shown embodiment, the screw rod 114 is shown to have coarse or large threads. These threads will allow for the scissor lift 109 to be moved a large amount with a small turn. Further, there is shown a side view of the elongated member 201. The elongated member 201 is configured to be large enough to take the weight from the spreadable substance 106. In the shown embodiment the scissor lift 109 has a wide flat first side 110a and second side 110b.

Figure 5:
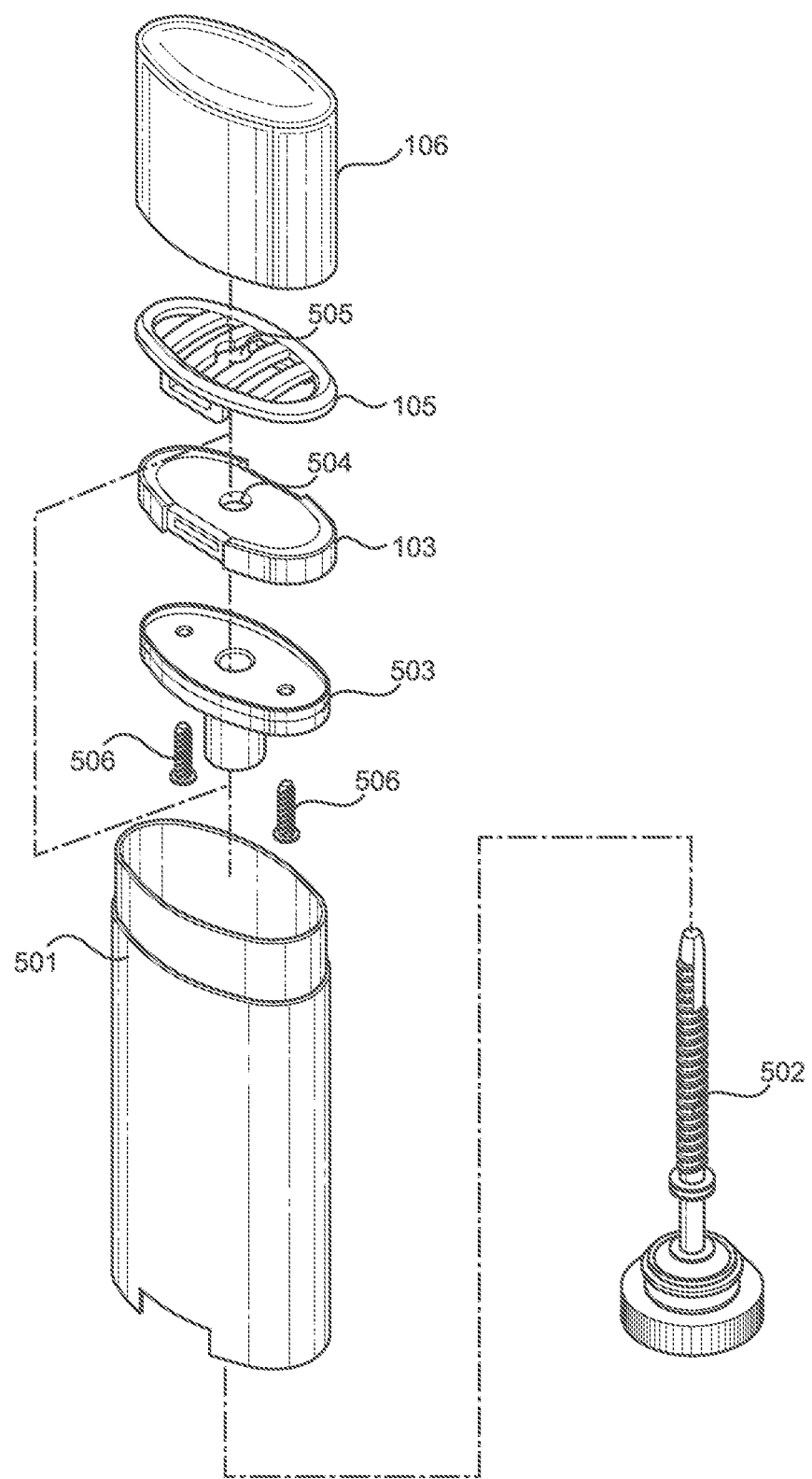
FIG. 5 shows an exploded view of an embodiment of a dispensing mechanism designed to work with an existing container.

Referring now to FIG. 5, there is shown an exploded view of an embodiment of a dispensing mechanism designed to work with an existing container. The existing container 501 has an existing vertical screw rod 502. The vertical screw rod 502 is configured to rise and lower an existing base 503. In this embodiment the movable base 103 is configured to attach to the existing base 503. In the shown embodiment the existing base 503 and the movable base 103 are attached using screws 506. In another embodiment other securement devices may be used.

In the shown embodiment the movable base 103 is configured to have an aperture 504 placed in the middle thereof. The aperture 504 is configured to allow the vertical screw rod 502 to be placed therethrough. Further, the attachment clip 105 is configured to have an aperture 505 placed therethrough. The aperture 505 is configured to have the vertical screw rod 502 placed therethrough. In this embodiment the spreadable substance 106 is able to be replaced as needed, without replacing the entire container.

In another embodiment the movable base 103 is applied directly to the screw rod 502. This will remove the need for the existing base 503 and the fasteners 506. In this embodiment the movable base 103 then has an attachment clip 105 secured thereto. The attachment clip 105 will secure a spreadable substance to the screw rod 502 allowing it to be dispensed as needed.

Figure 6:
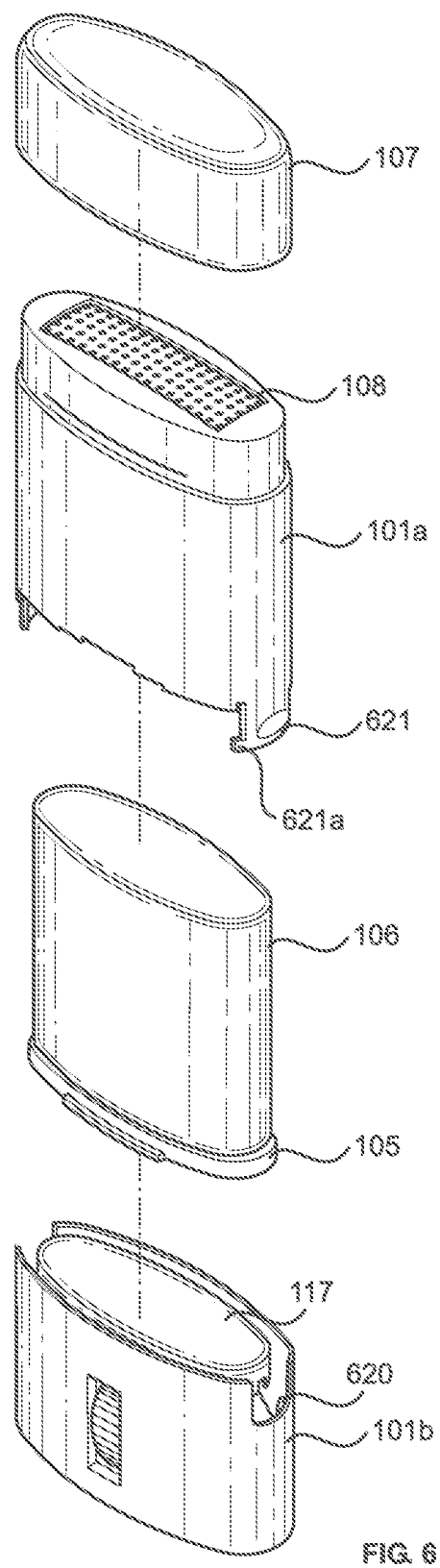
FIG. 6 shows an exploded view of an alternate embodiment of the repeatedly refillable reusable dispenser.

Referring now to FIG. 6, there is shown an exploded view of an alternate embodiment of the repeatedly refillable reusable dispenser. In the shown embodiment the housing can be separated into two sections, an upper section 101a and a lower section 101b. The lower section of the housing 101b houses a scissor lift and parts associated with the scissor lift. The scissor lift can then be attached to the attachment clip 105 of the spreadable substance cartridge via a corresponding fastener 117. The upper section of the housing 101a is removably securable to the lower section of the housing 101b. The upper section of the housing 101a has a pair of securement members 621 that will secure the upper section of the housing 101a to the lower section of the housing 101b. In one embodiment the securement happens by mating the securement members 621 to interior notches 620 located within the lower section of the housing 101b.

The securement member 621 have protrusions 621a that will fit within the interior notches 621a holding the upper section 101a to the lower section 101b.

In the shown embodiment, a cap 108 is secured to the upper section of the housing 101a, as previously described in relation to FIG. 1, above. The lid 107 can removably secure to the upper section of the housing 101a as previously described in FIG. 1, above.

Figure 7:
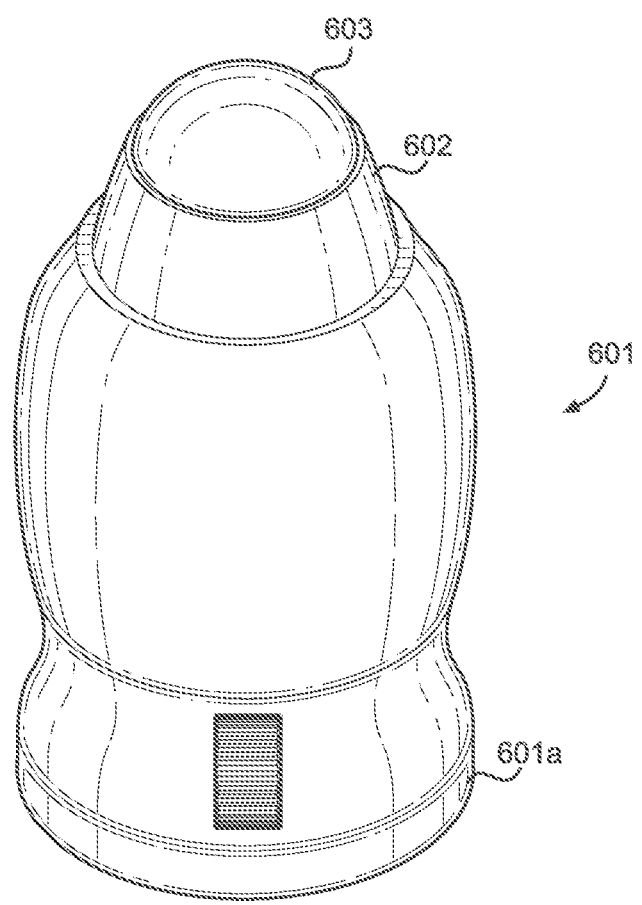
FIG. 7 shows a perspective view of an alternate embodiment of the repeatedly refillable reusable dispenser having a roll-on applicator.

Referring now to FIG. 7, there is shown a perspective view of an alternate embodiment of the repeatedly refillable reusable dispenser having a roll-on applicator. The roll-on dispenser is comprised of a housing 601 which includes a base 601a and an open upper end, which can be seen in FIG. 8. The housing 601 has an interior volume adapted to receive parts of the dispenser. In one embodiment the housing 601 is made from plastic.

In one embodiment the housing 601 has an ergonomic shape. In the shown embodiment, the housing 601 has a wider base 601a which narrows toward the middle of the housing 601. The housing 601 then widens again toward the open upper end. This will allow the housing 601 to be easily grasped by a user.

The open upper end of the housing 601 is removably attached to an upper section 602. The upper section 602 narrows further towards an opening. The opening houses a roller ball 603. The roller ball 603 will work with interior components to spread a substance onto a user as desired. In one embodiment, the roller ball 603 partially protrudes from the upper section 602.

Figure 8:
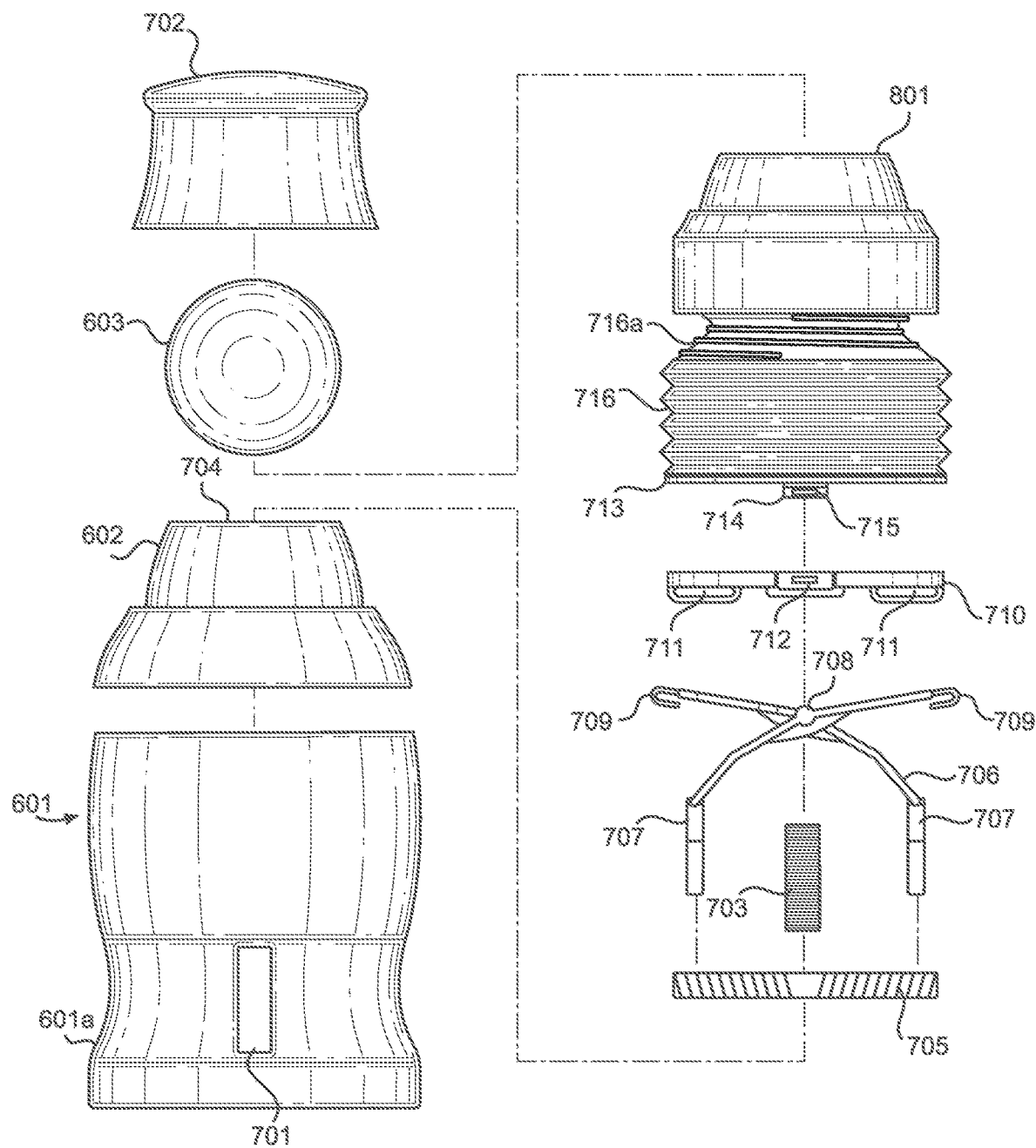
FIG. 8 shows an exploded view of an alternate embodiment of the repeatedly refillable reusable dispenser having a roll on applicator.

Referring now to FIG. 8, there is shown an exploded view of an alternate embodiment of the repeatedly refillable reusable dispenser having a roll on applicator. The housing 601 has an aperture 701 located near the base 601a. The aperture 701 is proportioned to fit a portion of a turn knob 703 which is part of the dispensing device. The housing 601 further includes a lid 702. The lid 702 is configured to removably attach to the upper section 602 and is contoured to cover portion of the roller ball 603 which will be protruding when the device is put together. In one embodiment the lid 702 snaps to the housing 601 and is frictionally held in place. In another embodiment the housing 601 will have threading thereon. The interior of the lid 702 will have threads therein. The lid 702 will be threaded onto the housing 601 to be held in place.

In the shown embodiment, the upper section 602 does not include the roller ball 603 therein. In one embodiment the upper section 602 is snap fit to the housing 601. In another embodiment the upper section 602 is threaded on to the housing 601. In the shown embodiment the upper section will fit flush with the housing 601 such that there is smooth connection. The opening 704 of the upper section 602 is proportioned such that the diameter of the roller ball is smaller than the opening 704. This will ensure that the roller ball cannot fall from the upper section 602.

The interior of the housing 601 holds a dispensing device. The dispensing device is comprised of a threaded rod 705. In one embodiment the threading on threaded rod 705 is a coarse threading. The threading on the threaded rod 705 moves such that the threading starts at the ends of the rods and moves towards the center of the threaded rod 705. The threaded rod is connected to the turn knob 703.

The turn knob 703 will allow the users to turn the threaded rod 705 by turning the turn knob 703. The threaded rod is further connected to a scissoring lift 706. The scissoring lift is comprised of two scissor sides connected by a pivot 708. The scissoring lift 706 will attach to the threaded rod 705 via threaded apertures 707 located at the lower ends of each side of the scissoring lift 706. The upper ends of the scissoring lift 706 have connectors 709 located thereon. In one embodiment the connectors 709 are hooks.

The connectors 709 of the scissoring lift 706 will attached to a cartridge compression plate 710. The cartridge compression plate 710 has a plurality of apertures 711 located on a bottom side thereof. In one embodiment the apertures 711 are elongated apertures. This will allow the connectors 709 from the scissoring lift 706 to move side to side as the scissor lift 706 moves.

The cartridge compression plate 710 has a connection prong 712. The connection prong 712 will attach to a cartridge connection plate 713. The cartridge connection plate 713 has a protrusion 714 located on the underside of the cartridge connection plate 713. The protrusion 714 has an aperture 715 location therein. The connection prong 712 will secure within the aperture 715 holding the cartridge compression plate 710 to the cartridge connection plate 713.

The cartridge connection plate 713 creates the bottom of a cartridge 716. In one embodiment the cartridge 716 is made from plastic. In another embodiment the cartridge 716 is made from paper products. In one embodiment the cartridge 716 is dissolvable in an aqueous media. In one embodiment the cartridge 716 has an accordion design. This will allow the cartridge 716 to fold down as compressed. In some embodiments the cartridge 716 has an upper protrusion 716a. The upper protrusion 716a will connect to the solution chamber 801 and the roller ball 603 as described in FIG. 10.

Figure 9:
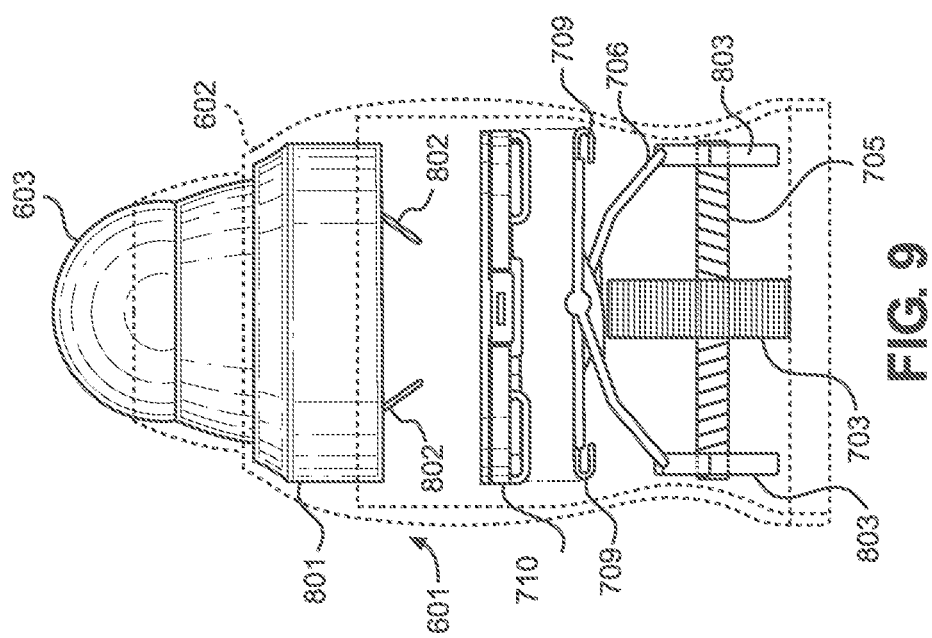
FIG. 9 shows a cross-sectional view of an alternate embodiment of the repeatedly refillable reusable dispenser having a roll-on applicator.

Referring now to FIG. 9, there is shown cross-sectional view of an alternate embodiment of the repeatedly refillable reusable dispenser having a roll-on applicator. The upper section 602 of the housing 601 has a solution chamber 801 located therein. The solution chamber 801 connects to the top side of a cartridge. In one embodiment the solution chamber 801 will connect to the protrusion of the cartridge. The solution from the cartridge will enter the solution chamber 801 and contact the roller ball 603.

The solution chamber 801 has an upper side that is configured to accept a portion of the roller ball 603. The roller ball 603 will have the ability to float slightly between the solution chamber 801 and the opening in the upper section 602. The solution chamber 801 along with the proportions of the opening of the upper section 602 the roller ball 603 will be held within the dispenser. This will prevent the roller ball 603 from becoming lost.

In some embodiments the solution chamber 801 has a cartridge opening device 802. In this embodiment when the cartridge is connected the device will puncture the cartridge allowing solution to exit the cartridge. In one embodiment the cartridge opening device 802 is a blade. In another embodiment the cartridge opening device 802 is a poker.

In this view the components of the dispensing device can be seen within the housing 601. The turn knob 703 is located within the aperture of the housing 601. The turn knob 703 is secured to the threaded rod 705. The scissor lift 706 is connected at one end to the threaded rod 705. The connectors 709 of the scissor lift 706 are connected to the cartridge compression plate 710. In the shown embodiment there are additional support braces 803 connected to the threaded apertures 707 of the scissor lift. The support braces 803 will contact the base 601a of the housing 601. This will wake pressure off of the threaded rod 705 and place the pressure on the base 601a.

Figure 10:
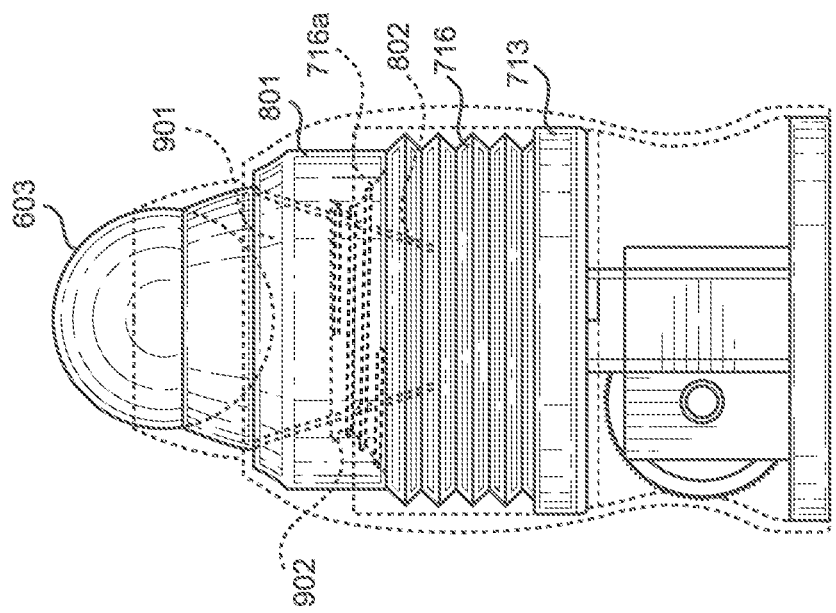
FIG. 10 shows a cross-sectional view of an alternate embodiment of the repeatedly refillable reusable dispenser having a roll-on applicator.

Referring now to FIG. 10, there is shown cross-sectional view of an alternate embodiment of the repeatedly refillable reusable dispenser having a roll-on applicator. In this view there is a solution cartridge 716 placed within the dispenser. The solution cartridge 716 is secured to the cartridge compression plate 710 via the cartridge connection plate 713. The upper end of the cartridge 716 is connected to the solution camber 801. A solution 901 can be seen filling the cartridge 716 and the solution chamber 801. The solution is then spread along the roller ball 603.

The turn knob 703 is used to activate the dispensing device. In one embodiment the dispensing device is used to apply pressure to the contents of the cartridge 716. This will force solution into the solution chamber 801 and onto the ball. In other embodiments the dispensing device is used to slowly compress the cartridge gradually releasing solution. In one embodiment the dispensing device will over compress the cartridge 716 which will ensure that all of the contents of the cartridge is dispelled.

In the shown embodiment the cartridge has an upper protrusion 716a that will enter the solution chamber 801. The upper protrusion is configured to fit around the opening device 802. The opening device 802 will open the cartridge 713. The upper protrusion 716a has a plurality of threads 902 location on one side thereof. There interior if the solution chamber 801 will have a matching set of threading. This will allow the cartridge 713 to be threaded into the solution chamber 801.

Figure 11:
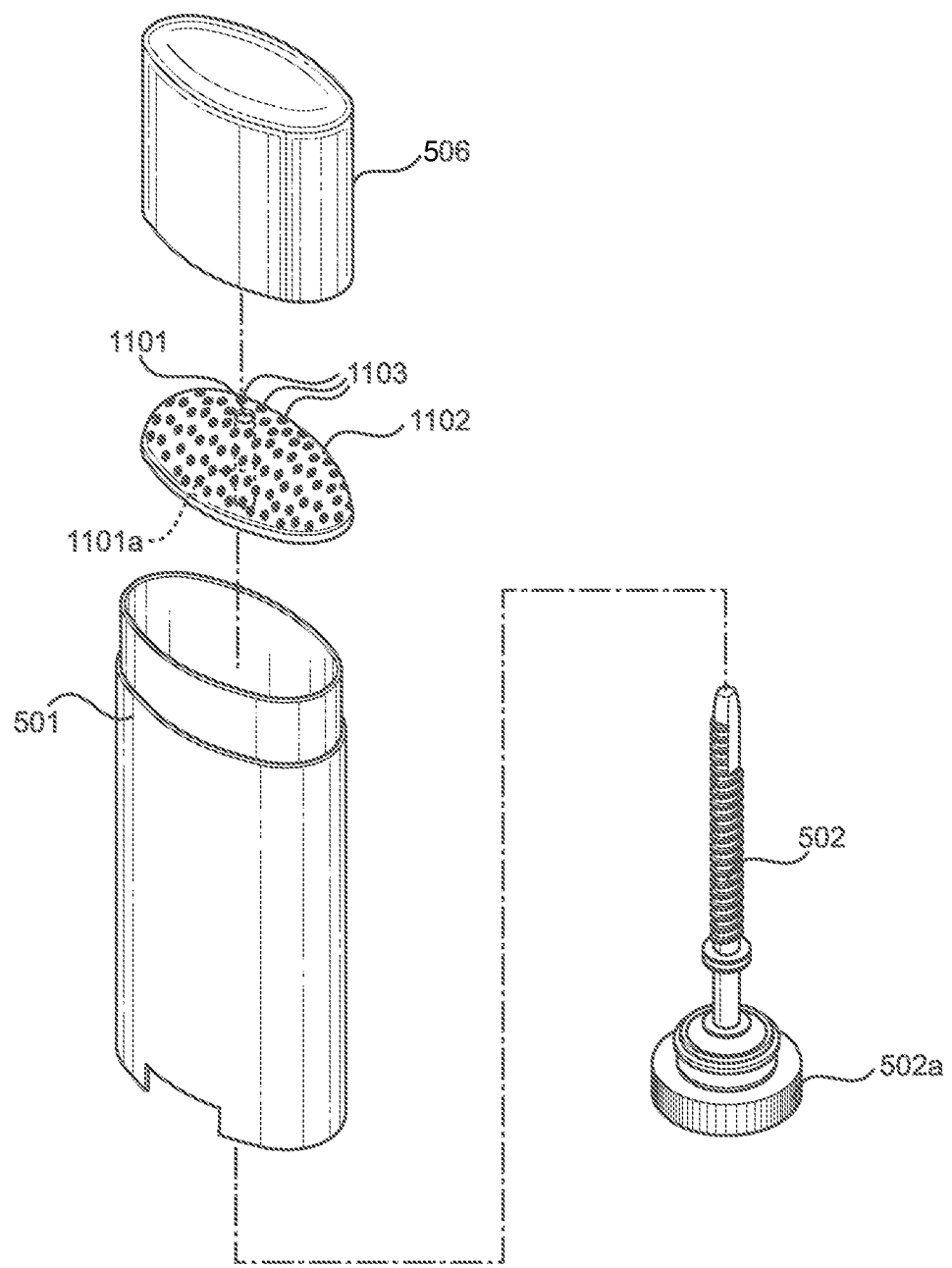
FIG. 11 shows an exploded view of an embodiment of a repeatedly refillable reusable retrofit dispenser.

Referring now to FIG. 11, there is shown an exploded view of an embodiment of a repeatedly refillable reusable retrofit dispenser. The retrofit dispenser has a housing 501. The housing 501 has a bottom side and an open top end. The housing 501 has a screw rod 502 rotatably secured into the bottom of the housing 501. The screw rod 502 has threading along the length of the screw rod 502. One end of the screw rod 502 there is a turn knob 502a. The housing 501 has a lid 506 that is proportioned to frictionally engage with the open top end of the housing 501.

In the shown embodiment there is a cartridge plate 1102 shown. The cartridge plate 1102 has a threaded aperture 1101 located through the cartridge plate 1102. This threaded aperture 1101 will allow the cartridge plate 1102 to engage the screw rod 502. In one embodiment the cartridge plate 1102 is made from polyvinyl alcohol. In another embodiment the cartridge plate 1102 is made from a cellulose and polyvinyl alcohol mixture.

In the shown embodiment the cartridge plate 1102 has a domed shape. This means that the middle of the cartridge plate 1102 is rounded in an upward manner. This will allow for a channel 1101a to be disposed under the cartridge plate 1102 and secured about the threaded aperture 1101. In one embodiment the channel 1101a is a threaded channel. This will allow the channel 1101a to also engage with the screw rod 502 adding additional support to the cartridge plate 1102. The cartridge plate 1102 further has a plurality of apertures 1103 therethrough. These apertures 1103 will allow for a spreadable substance to better affix to the cartridge plate 1102.

Figures 12, 13:
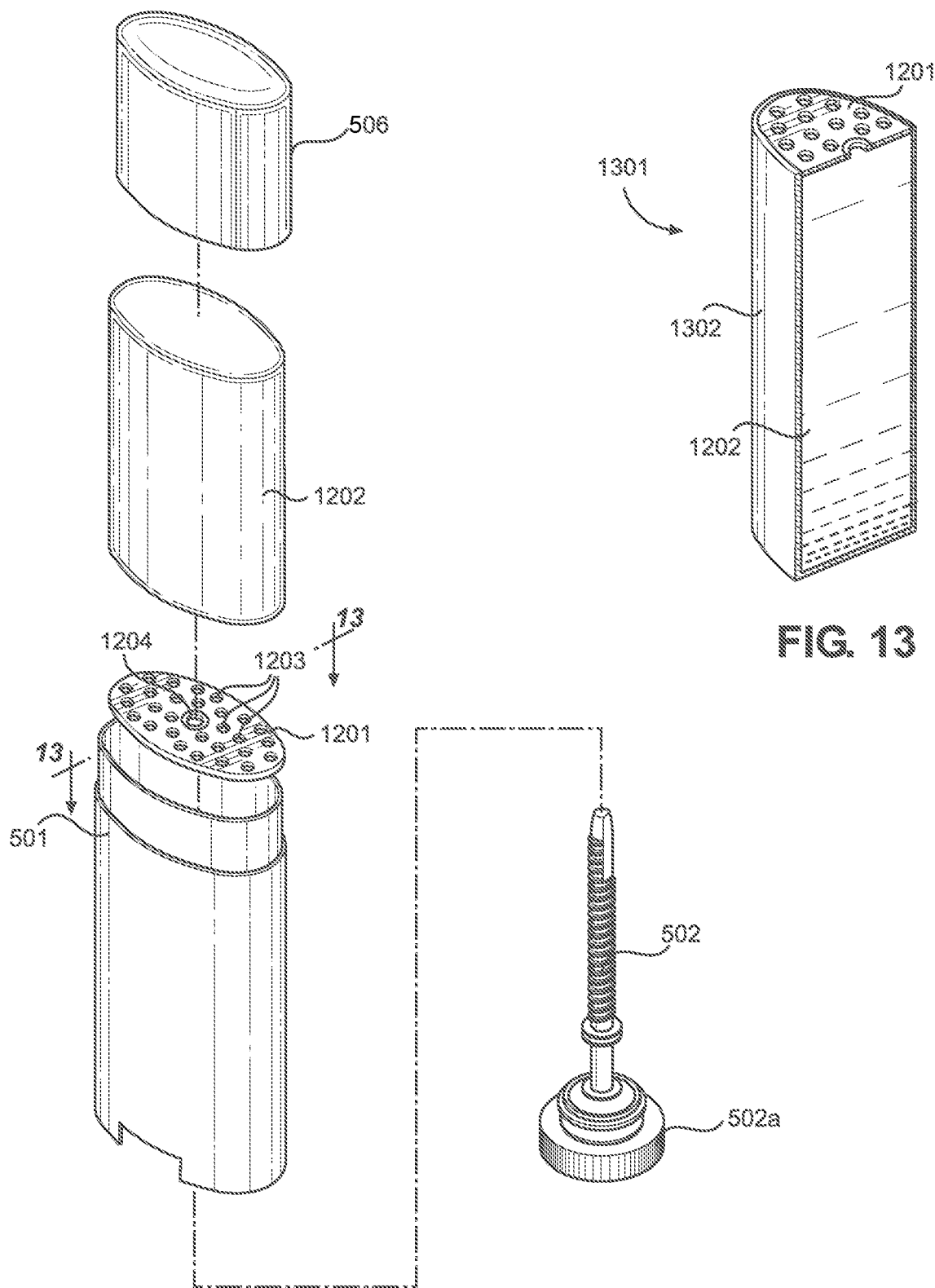
FIG. 12 shows an exploded view of an embodiment of a repeatedly refillable reusable retrofit dispenser.
FIG. 13 shows a cross-sectional view of an embodiment of a repeatedly refillable reusable retrofit dispenser cartridge.

Referring now to FIG. 12, there is shown an exploded view of an embodiment of a repeatedly refillable reusable retrofit dispenser. The retrofit dispenser has a housing 501. The housing 501 has a bottom side and an open top end. The housing 501 has a screw rod 502 rotatably secured into the bottom of the housing 501. The screw rod 502 has threading along the length of the screw rod 502. One end of the screw rod 502 there is a turn knob 502a. The housing 501 has a lid 506 that is proportioned to frictionally engage with the open top end of the housing 501.

In this embodiment of the retrofit dispenser, the cartridge plate 1201 is a planar plate. This will allow for more of the spreadable substance 1202 to be useable. In this embodiment the cartridge plate 1201 has a threaded aperture 1204 through the cartridge plate 1201. This threaded aperture 1204 will allow the cartridge plate 1201 to engage with the screw rod 502. The cartridge plate 1201 further has a plurality of apertures 1203 located therethrough. These apertures 1203 will engage a spreadable substance 1202 better affixing the cartridge plate 1201 to the spreadable substance 1202. In one embodiment the cartridge plate 1201 is made from polyvinyl alcohol. In another embodiment the cartridge plate 1201 is made from a cellulose and polyvinyl alcohol mixture.

The cartridge plate 1201 will secure to the spreadable substance 1202. Then the cartridge plate 1201 will engage the screw rod 502. The screw rod 502 will enable a user to move the cartridge plate 1201 and the spreadable substance 1202 up and down within the housing 501. This will allow for a user to spread the decided amount of spreadable substance 1202 then replace the lid 506 on the housing 501.

Referring now to FIG. 13, there is shown a cross-sectional view of an embodiment of a repeatedly refillable reusable retrofit dispenser cartridge. One embodiment of a cartridge 1301 for the retrofit dispensing device includes a housing 1302. The housing 1302 of the cartridge 1301 is proportioned such that the dimensions of the interior of the housing 1302 are similar to the interior of the housing of the retrofit dispenser. This will ensure that that spreadable substance will fit within the housing of the retrofit dispenser. Further, this will allow for a maximized amount of the spreadable substance to be placed within the retrofit dispenser. The housing 1302 has at least one sidewall, a bottom section and an open top section. This will create the interior volume. In one embodiment the housing 1302 is plastic. In another embodiment the housing 1302 is made from polyvinyl alcohol. In yet a further embodiment the housing 1302 is made from a mixture of cellulose and polyvinyl alcohol.

In use, a spreadable substance 1202 will be placed into the cartridge 1301. In one embodiment the spreadable substance 1202 is in liquid form when it is placed within the cartridge 1301. In one embodiment the cartridge plate 1201 is then pressed into the spreadable substance 1202. The spreadable substance 1202 will affix to the cartridge plate 1201. A seal is then placed over the top of the cartridge 1301 to prevent air form entering.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solution cartridge retrofit device for a dispenser, the dispenser comprising:
    a housing having a bottom side and an opened upper side;
    a screw rod rotatably secured within the bottom of the housing;
    a cartridge plate engaged with the screw rod via a threaded aperture located through the cartridge plate, wherein the cartridge plate is proportioned to fit within the housing;
    a removable cartridge secured to the cartridge plate, the removable cartridge containing a spreadable substance.

2. The solution cartridge retrofit device of claim 1, wherein the cartridge plate is comprised of polyvinyl alcohol.

3. The solution cartridge retrofit device of claim 1, the threaded aperture of the cartridge plate has an elongated channel connected to a bottom side of the cartridge plate, wherein the elongated channel has threads therein.

4. The solution cartridge retrofit device of claim 1, wherein the cartridge plate is a domed plate.

5. The solution cartridge retrofit device of claim 1, wherein the cartridge plate has a plurality of apertures located therethrough that will allow for a spreadable substance to be affixed to the cartridge plate by entering the apertures.

6. The solution cartridge retrofit device of claim 1, wherein the cartridge has a removable housing;
    wherein the removable housing will be removed from the spreadable substance once the cartridge plate is secured to the threaded rod.

7. The solution cartridge retrofit dispenser of claim 6, wherein the removable cartridge housing is made from polyvinyl alcohol.

8. The solution cartridge retrofit dispenser of claim 6, wherein the removable cartridge housing is made from plastic.

9. The solution cartridge retrofit dispenser of claim 6, wherein the removable cartridge housing is made from a mixture that includes cellulose.

10. A solution cartridge retrofit device for a dispenser, the dispenser comprising:
    a housing having a bottom side and an opened upper side;
    a screw rod rotatably secured through the bottom side of the housing;
    a cartridge plate engaged with the screw rod via a threaded aperture located through the cartridge plate, wherein the cartridge plate is proportioned to fit within the housing;
    a removable cartridge secured to the cartridge plate, the removable cartridge containing a spreadable substance;
    wherein the cartridge has a removable housing, wherein the removable housing will be removed from the spreadable substance once the cartridge plate is secured to the threaded rod.

11. The solution cartridge retrofit device of claim 10, wherein the removable cartridge housing is comprised of polyvinyl alcohol.

12. The solution cartridge retrofit device of claim 10, wherein the cartridge plate is comprised of polyvinyl alcohol.

13. The solution cartridge retrofit device of claim 10, wherein the cartridge plate has a plurality of apertures located therethrough.

14. The solution cartridge retrofit dispenser of claim 1, wherein the removable cartridge housing is made from plastic.

15. The solution cartridge retrofit dispenser of claim 1, wherein the removable cartridge housing is made from a mixture that includes cellulose.

* * * * *